United States Patent Office 2,931,707
Patented Apr. 5, 1960

---

2,931,707

METHOD OF PREPARING HYDRAZINE SULPHATE FROM BENZOPHENONE-AZINE

Robert Meyer, Tassin-la-Demi-Lune, France, and Daniel Pillon, Lyon, France, assignors to Société des Usines Chimiques Rhone-Poulenc, Paris, France, a French body corporate No Drawing. Application November 24, 1958
Serial No. 775,737

Claims priority, application France December 6, 1957

7 Claims. (Cl. 23—117)

This invention relates to the preparation of hydrazine sulphate from benzophenone-azine, which product can be prepared, as is known, by catalytic air oxidation of benzophenone-imine, which is itself obtained by the action of ammonia on benzophenone.

Curtius and Rauterberg, Journal für praktische Chemie, 44, 200 (1891), have already shown that benzophenone-azine is hydrolysed under the influence of sulphuric acid to give benzophenone and hydrazine. They effected this conversion by heating benzophenone-azine for three hours with dilute sulphuric acid, steam distilling the product, and extracting the distillate with ethyl ether. They isolated the benzophenone by evaporation of the ethereal extract, and the hydrazine sulphate by concentration of the aqueous residue.

This procedure is complicated and in particular requires the evaporation of large quantities of water. If it were industrially applied, the disadvantage of the conventional processes for the preparation of hydrazine by the action of chlorine on ammonia would be encountered, namely that the hydrazine is obtained in the form of a very dilute aqueous solution, e.g. of concentration 1% or 2%, from which it must be isolated by distillation of the water.

It is an object of the present invention to provide a process for producing hydrazine sulphate from benzophenone-azine which shall be free from this disadvantage.

According to the invention hydrazine sulphate is made by hydrolysing benzophenone-azine by heating it with concentrated sulphuric acid together with sufficient water for the hydrolysis. (By "concentrated sulphuric acid" we mean sulphuric acid of density at least 64° Bé., i.e. 85%.) Hydrazine sulphate and benzophenone are then obtained in substantially quantitative yields in accordance with the scheme:

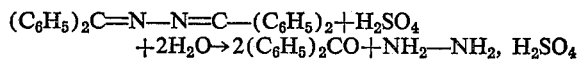

In this process the hydrazine sulphate is obtained as a solid mixture with the benzophenone, from which the benzophenone can be extracted with an organic solvent leaving hydrazine sulphate in the solid state.

In a preferred method of carrying out the process of the invention, a solution of benzophenone-azine in sufficient sulphuric acid to form a clear solution (preferably at least an equimolecular proportion) at an elevated temperature, advantageously 90°–130° C., is first prepared, whereafter the quantity of water necessary for the hydrolysis is added with stirring and the mixture is heated, preferably still to a temperature between 90° and 130° C., until the hydrolysis is substantially complete. After the hydrolysis, the liberated benzophenone may be extracted by means of a solvent such as benzene. The extract will usually contain part of any uncombined sulphuric acid. The residue of anhydrous hydrazine sulphate may also be contaminated with uncombined sulphuric acid, which can be eliminated by systematic washing with water, the solubility of the hydrazine sulphate being very low in water charged with sulphuric acid. If desired, the hydrazine sulphate may thereafter be converted into hydrazine base by conventional methods. Alternatively, the crude mixture of hydrazine sulphate and sulphuric acid may be directly employed for the preparation of hydrazine base.

Sulphuric acid accompanying the benzophenone may be eliminated by simply washing the benzophenone solution with water. The benzophenone can be obtained by evaporation of the solvent, and can be directly re-used in the preparation of further benzophenone-imine for conversion into benzophenone-azine by oxidation. Instead of pure benzophenone-azine, a technical mixture of benzophenone-azine and benzophenone, such as is obtained by air oxidation of the crude product resulting from the treatment of benzophenone by ammonia, may be advantageously employed.

The following example illustrates the invention without limiting it.

*Example*

62 g. of a mixture containing 49% of benzophenone-azine and 51% of benzophenone is melted at 100–110° C., and 17.4 g. of sulphuric acid (66° Bé.) are added (twice the theoretical amount).

The mixture dissolves to give a clear solution. After stirring for half an hour at 110° C. the temperature is allowed to fall to 90° C. and 3 g. of water are added. A precipitate forms. After stirring for a further 15 minutes at 90°–100° C., the product is allowed to cool to 40° C. The solid mass obtained is treated with 100 cc. of benzene, whereupon a part dissolves. The residue is filtered off and washed with 20 cc. of benzene. 13.5 g. of hydrazine sulphate in a concentration of 80% are recovered on the filter. After washing to eliminate sulphuric acid, there is obtained 10.75 g. of hydrazine sulphate in a concentration of 96.6%, which corresponds to a yield of 95% on the benzophenone-azine.

After washing with water and evaporation, the benzene solution gives an oil which sets and which consists of benzophenone, M.P. 45–46° C., in a yield of 98%.

We claim:

1. Process for the production of hydrazine sulphate, which comprises hydrolysing benzophenone-azine by heating it with sulphuric acid of concentration at least 85% and sufficient water for the hydrolysis, at 90–130° C.

2. Process for the production of hydrazine sulphate, which comprises hydrolysing benzophenone-azine by heating it to 90°–130° C. with at least an equimolecular proportion of sulphuric acid of concentration at least 85% and sufficient water for the hydrolysis.

3. Process for the production of hydrazine sulphate, which comprises forming a clear solution of benzophenone-azine in sulphuric acid of concentration at least 85%, adding water in amount sufficient to hydrolyse the benzophenone-azine and heating the mixture to 90°–130° C. until substantially all the benzophenone-azine has been hydrolysed.

4. Process for the production of hydrazine sulphate, which comprises dissolving a mixture of benzophenone-azine and benzophenone in sulphuric acid of concentration at least 85% at a temperature of 90°–130° C. to form a clear solution in which the molecular proportion of the sulphuric acid is at least equal to that of the benzophenone-azine, adding sufficient water to hydrolyse the benzophenone-azine, and maintaining the solution at 90°–130° C. until the benzophenone azine is substantially completely hydrolysed.

5. Process according to claim 1, which comprises removing benzophenone from the hydrolysis products by solvent extraction.

6. Process according to claim 1, which comprises employing the benzophenone-azine in admixture with benzophenone.

7. Process for the production of hydrazine sulphate, which comprises dissolving a mixture of benzophenone-azine and benzophenone in sulphuric acid of concentration at least 85% at a temperature of 90°–130° C. to form a clear solution in which the molecular proportion of the sulphuric acid is at least equal to that of the benzophenone-azine, adding sufficient water to hydrolyse the benzophenone-azine, and maintaining the solution at 90°–130° C. until the benzophenone-azine is substantially completely hydrolysed.

References Cited in the file of this patent

Curtius et al.: "Einwirkung von Hydrazinhydrat auf Benzophenon," Journal für Praktische Chemie, Verlag von Johann Ambrosius Barth, Leipzig, 1891, Band 44, pages 199 and 200.